United States Patent
Kim

(10) Patent No.: US 9,145,957 B2
(45) Date of Patent: Sep. 29, 2015

(54) MOTOR HAVING SCREW JOINT

(71) Applicant: LG INNOTEK CO., LTD., Seoul (KR)

(72) Inventor: Se Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 13/916,954

(22) Filed: Jun. 13, 2013

(65) Prior Publication Data

US 2013/0333499 A1    Dec. 19, 2013

(30) Foreign Application Priority Data

Jun. 15, 2012    (KR) .................. 10-2012-0064170

(51) Int. Cl.
| | |
|---|---|
| F16H 3/06 | (2006.01) |
| F16H 27/02 | (2006.01) |
| F16H 29/02 | (2006.01) |
| F16H 29/20 | (2006.01) |
| F16H 25/12 | (2006.01) |
| F16C 11/06 | (2006.01) |

(52) U.S. Cl.
CPC ............ *F16H 25/12* (2013.01); *F16C 11/0609* (2013.01); *F16C 11/0685* (2013.01); *Y10T 74/18576* (2015.01)

(58) Field of Classification Search
CPC ............ B60Q 2200/32; F16C 11/0604; F16C 11/0685; F16C 11/0695; B29C 65/564
USPC .............. 74/89.23, 473.34; 362/37, 515, 525, 362/528; 403/76, 85, 122, 130, 152, 185, 403/267, 269, 306, 316, 376, 379.2, 408.1; 29/522.1, 525.01, 525.09, 525.15, 29/527.1, 530, 898.052; 264/112, 249, 264/274; 384/211
See application file for complete search history.

(56) References Cited

U.S. PATENT DOCUMENTS

| | | | | | |
|---|---|---|---|---|---|
| 3,952,390 | A | * | 4/1976 | Amos ...................... | 29/898.053 |
| 3,965,554 | A | * | 6/1976 | Amos ...................... | 29/898.053 |
| 4,090,709 | A | * | 5/1978 | Fujii ............................. | 473/566 |
| 4,461,065 | A | * | 7/1984 | Futterer ......................... | 29/446 |
| 5,090,654 | A | * | 2/1992 | Ridings et al. ................ | 248/343 |
| 5,114,263 | A | * | 5/1992 | Kanamaru et al. ............. | 403/274 |
| 5,360,282 | A | * | 11/1994 | Nagengast et al. ........... | 403/131 |
| 5,672,365 | A | * | 9/1997 | Ishii et al. ..................... | 425/127 |
| 6,350,060 | B1 | * | 2/2002 | Peterson ........................ | 384/211 |
| 6,551,006 | B2 | * | 4/2003 | Kincaid et al. ................ | 403/130 |
| 7,517,123 | B2 | * | 4/2009 | Aguinaga et al. ............. | 362/528 |
| 2002/0172546 | A1 | * | 11/2002 | Rivin ............................ | 403/130 |

* cited by examiner

*Primary Examiner* — William Kelleher
*Assistant Examiner* — Jake Cook
(74) *Attorney, Agent, or Firm* — Saliwanchik, Lloyd & Eisenschenk

(57) ABSTRACT

A motor having a lead screw is provided, the motor including a motor body, a lead screw connected to an output axis of the motor body to reciprocally move to a horizontal direction, a ball-shaped joint member connected to a distal end of the lead screw, and a coupling member coupling the lead screw to the ball-shaped joint member, whereby the coupling member is prevented from being disengaged by heat-sealing a surface insertedly coupled by the coupling member of the joint member.

5 Claims, 2 Drawing Sheets

MOTOR HAVING SCREW JOINT

CROSS-REFERENCE TO RELATED APPLICATION

This application claims the benefit under 35 U.S.C. §119 of Korean Application No. 10-2012-0064170, filed Jun. 15, 2012, which is hereby incorporated by reference in its entirety.

BACKGROUND OF THE INVENTION

1. Field of the Invention

The teachings in accordance with exemplary and non-limiting embodiments of this disclosure relate generally to a screw joint coupling structure of an intelligent stepping motor.

2. Description of Related Art

Concomitant with recent increased interest in vehicle safety, various head lamp control devices have been proposed configured to adjust an illumination angle of a vehicle head lamp, whereby illumination of direction to which a driver turns can be further increased when the driver drives a vehicle in the night.

In general, an angle adjustment device using a motor operation is used to change an angle of a head lamp on a vehicle, where a distal end of a motor is provided with a lead screw joint for joint connection to adjust an illumination direction of the head lamp by moving an angle adjustment unit.

A distal end of the lead screw installed at the distal end of the motor is fixed by a ball-shaped joint member using a spring pin. That is, the lead screw is formed with a first pin hole, and a second pin hole is formed at a coupling position of the ball-shaped joint member to allow the spring pin to be press-fitted into the first and second pin holes, and the ball-shaped joint member is fixed by being heat sealed.

However, the coupling structure thus described suffers from a disadvantage in that operation efficiency decreases due to a 2-step assembly process of a heat sealing process and a spring pin press-fitting process for coupling the frequently operating ball-shaped joint member to a screw joint. Another disadvantage is that a frequent movement may be generated at the coupling area to prevent a reciprocal feeding operation of the lead screw from being accurately realized, in a case a fine gap is formed at a spring pin press-fitting area.

BRIEF SUMMARY

It is an object of the present disclosure to provide a motor having a structurally-improved lead screw configured to accurately maintain a reciprocal feeding operation of a lead screw and to improve productivity by being provided with a simplified assembly operation.

In one general aspect of the present disclosure, there is provided a motor having a lead screw, the motor comprising:
a motor body;
a lead screw connected to an output axis of the motor body to reciprocally move to a horizontal direction;
a ball-shaped joint member connected to a distal end of the lead screw; and
a coupling member coupling the lead screw to the ball-shaped joint member, wherein the coupling member prevents the coupling member from being disengaged by heat-sealing a surface insertedly coupled by the coupling member of the joint member.

Preferably, but not necessarily, a coupling position between the lead screw and the ball-shaped joint member may be formed with first and second coupling holes passed through by the coupling member.

Preferably, but not necessarily, the second coupling hole may be closed, in a case the joint member is heat-sealed.

Preferably, but not necessarily, the coupling member may be formed with a length greater than a diameter of the lead screw, but smaller than a diameter of the joint member.

Preferably, but not necessarily, the coupling member may be provided in a tube-shaped elastic pin.

Preferably, but not necessarily, the coupling member may be formed with a metal material.

Preferably, but not necessarily, the lead screw may be screw-connected to an output axis of the motor body.

In advantageous effect, an exemplary embodiment of the present disclosure can prevent a defect including a disengaged coupling member, even if there is generated a repetitive shock load caused by a coupling hole inserted by a coupling member, provided in a tube-shaped elastic pin through heat-seal of a joint member, being closed.

DETAILED DESCRIPTION

Hereinafter, a motor having a lead screw according to an exemplary embodiment of the present disclosure will be described in detail with reference to the accompanying drawings.

Figure 1:
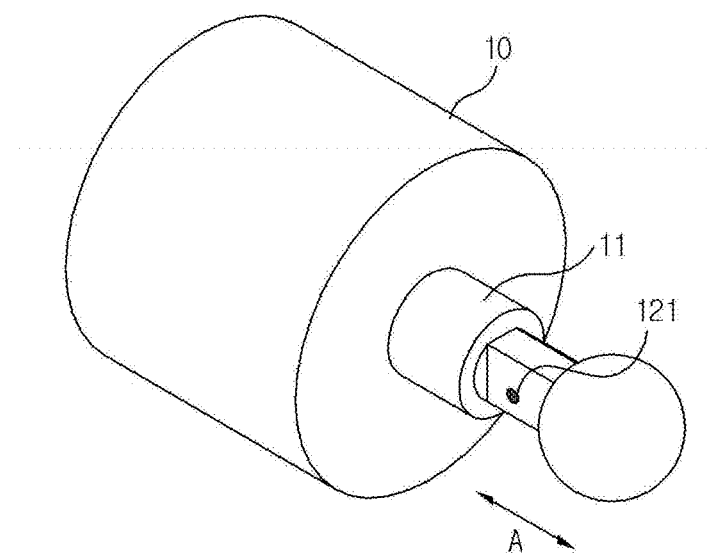
FIG. 1 is a perspective view illustrating a motor having a lead screw according to an exemplary embodiment of the present disclosure.
Figure 2:
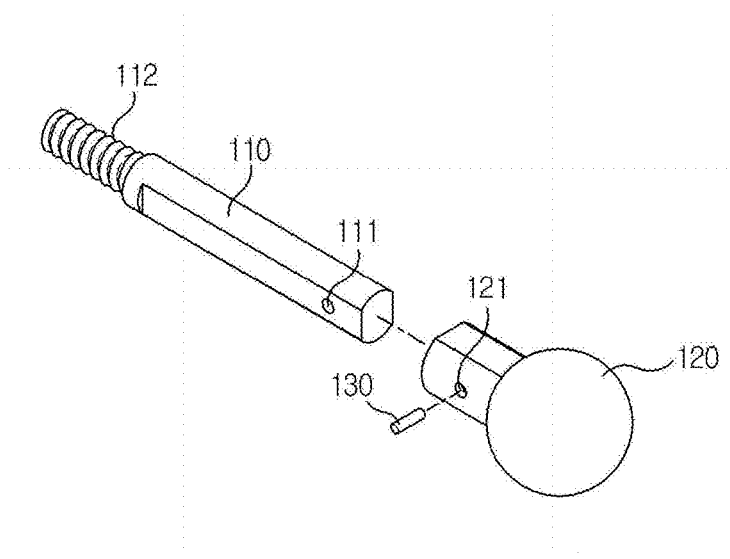
FIG. 2 is an exploded perspective view illustrating a coupling relationship between a lead screw and a ball-shaped joint member according to an exemplary embodiment of the present disclosure.
Figure 3:
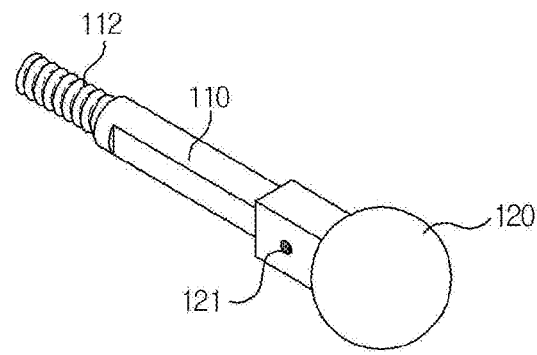
FIG. 3 is a front perspective view illustrating a coupled state between a lead screw and a ball-shaped joint member by heat-seal.
Figure 4:
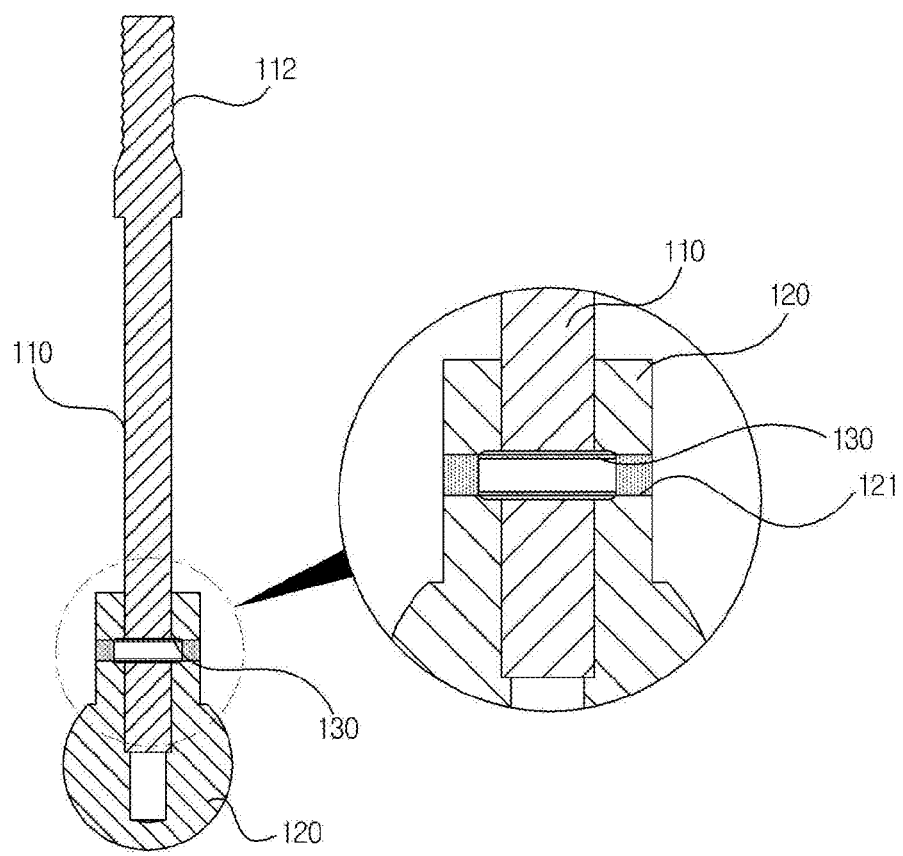
FIG. 4 is a cross-sectional view of FIG. 3.

FIG. 1 is a perspective view illustrating a motor having a lead screw according to an exemplary embodiment of the present disclosure, FIG. 2 is an exploded perspective view illustrating a coupling relationship between a lead screw and a ball-shaped joint member according to an exemplary embodiment of the present disclosure, FIG. 3 is a front perspective view illustrating a coupled state between a lead screw and a ball-shaped joint member by heat-seal, and FIG. 4 is a cross-sectional view of FIG. 3.

Referring to FIGS. 1 to 4, a motor according to the present disclosure includes a motor body (10), a lead screw (110), a joint member (120) and a coupling member (130).

The motor body (10) is preferably provided with an intelligent stepping motor (ISM), and is optimally provided to a head lamp direction adjustment device of a vehicle through an accurate control. A distal end of the motor body (10) is provided with an output axis (11) configured to convert a rotation power of a motor to a reciprocating motion and output the rotation power.

The lead screw (110) is connected to the output axis (11) to perform a reciprocating motion as in an arrow 'A' direction of FIG. 1 by receiving a power outputted from the output axis (11) of the motor body (10). The lead screw (110) may be formed at a distal end with a screw thread (112) to be screw-connected to the output axis (11).

Referring to FIGS. 2 and 3, the joint member (120) is coupled to the other distal end formed with the screw thread (112) of the lead screw (110), and may be provided with a distal end with a ball shape. The joint member (120) is connected to a head lamp direction transfer unit of a vehicle (not shown) to perform a function of transferring a power to the head lamp direction transfer unit in response to horizontal (back and forth) operation of the lead screw (110).

The coupling member (130) functions to connect the joint member (120) to the lead screw (110). To this end, each of the joint member (120) and the lead screw (110) is provided with a first coupling hole (111) and a second coupling hole (121). The first and second coupling holes (111, 121) are installed at a mutually-communicating position from a coupling position between the joint member (120) to the lead screw (110).

Hence, in a case a coupling unit of the joint member (120) is inserted into the lead screw (110), the first and second coupling holes (111, 121) mutually communicate at a coupling position, and the joint member (120) can be easily coupled to the lead screw (110) by thoroughly coupling the coupling member (130) to the first and second coupling holes (111, 121).

Meanwhile, as illustrated in FIGS. 2, 3 and 4, the coupling member (130) having passed the first and second coupling holes (111, 121) may be provided with a tube-shaped, centrally-hollowed elastic pin of metal material.

Referring to FIG. 4, length of the coupling member (130) may be greater than a width of the lead screw (110), but shorter than a width of the joint member (120), whereby both distal ends of the coupling member (130) may be protruded from a coupling position to outside of the first coupling hole (111) of the lead screw (110), and a protruded portion may be positioned at an inside of the second coupling hole (121) of the joint member (120).

As noted from the foregoing, in a case the coupling member (130) is coupled to the first and second coupling holes (111, 121) provided at each of the joint member (120) and the lead screw (110), an operator may close the second coupling hole (121) exposed to the outside of the joint member (120) by heat-sealing to prevent the coupling member (130) from being disengaged.

That is, because the joint member (120) is generally formed with a resin material, and as illustrated in FIGS. 1 and 3, in a case a position formed with the second coupling hole (121) is heat-sealed by applying heat and pressure, vicinity formed with the second coupling hole (121) is thermally deformed and melts down. The melted-down resin may be impregnated into an inside of the second coupling hole (121) to block an entire area of the second coupling hole (121), or part of the thermally-deformed resin may flow into the second coupling hole (121) to close or block only a part of the second coupling hole (121).

Thus, the coupling member (130) inserted through the second coupling hole (121) can be prevented from being disengaged from a coupling position by an outside shock, because the second coupling hole (121) is closed by heat-sealing.

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A motor having a lead screw, the motor comprising:
   a motor body;
   a lead screw connected to an output axis of the motor body to reciprocally move in a horizontal direction, wherein the lead screw is formed with a screw thread at one end to be screw-connected with the output axis of the motor body and formed with a first coupling hole at the other end;
   a ball-shaped joint member formed with a coupling unit to receive the other end of the lead screw and having a second coupling hole, wherein the second coupling hole is formed at a mutually communicable coupling position with respect to the first coupling hole of the lead screw; and
   a coupling member passing through the first and second coupling holes for coupling the lead screw to the ball-shaped joint member,
   wherein the joint member is thermally deformed by applying heat and pressure at a position formed with the second coupling hole to prevent the coupling member from being disengaged from the coupling position.

2. The motor of claim 1, wherein the second coupling hole is closed when the joint member is heat-sealed.

3. The motor of claim 1, wherein the coupling member is formed with a length greater than a diameter of the lead screw, but smaller than a diameter of the joint member.

4. The motor of claim 1, wherein the coupling member is provided with a hollow elastic pin.

5. The motor of claim 4, wherein the coupling member is formed with a metal material.

* * * * *